United States Patent
Jung

(10) Patent No.: US 10,848,038 B2
(45) Date of Patent: Nov. 24, 2020

(54) WINDING METHOD FOR BLDC MOTOR

(71) Applicant: Hyoseong Electric Co., Ltd., Busan (KR)

(72) Inventor: Jingeun Jung, Busan (KR)

(73) Assignee: Hyoseong Electric Co., Ltd., Busan (KR)

( * ) Notice: Subject to any disclaimer, the term of this patent is extended or adjusted under 35 U.S.C. 154(b) by 540 days.

(21) Appl. No.: 15/893,256

(22) Filed: Feb. 9, 2018

(65) Prior Publication Data

US 2019/0165658 A1 May 30, 2019

(30) Foreign Application Priority Data

Nov. 27, 2017 (KR) .......................... 10-2017-0159352

(51) Int. Cl.

| | | |
|---|---|---|
| *H02K 15/08* | (2006.01) | |
| *H02K 15/02* | (2006.01) | |
| *H02K 15/095* | (2006.01) | |
| *H02K 3/52* | (2006.01) | |

(52) U.S. Cl.
CPC ........... *H02K 15/08* (2013.01); *H02K 15/026* (2013.01); *H02K 15/095* (2013.01); *H02K 3/522* (2013.01)

(58) Field of Classification Search
CPC ...... H02K 3/522; H02K 15/026; H02K 15/08; H02K 15/095
See application file for complete search history.

(56) References Cited

U.S. PATENT DOCUMENTS

| | | | | |
|---|---|---|---|---|
| 3,324,536 A * | 6/1967 | Hill | ...................... | H02K 15/068 29/734 |
| 3,522,650 A * | 8/1970 | Cutler | .................. | H02K 15/068 29/596 |
| 3,732,897 A * | 5/1973 | Arnold | .................... | H01F 41/06 140/92.1 |
| 3,797,105 A * | 3/1974 | Arnold | ................. | H02K 15/068 29/596 |
| 4,005,347 A * | 1/1977 | Erdman | .................. | F23N 3/082 318/400.4 |
| 4,015,182 A * | 3/1977 | Erdman | ................ | F25B 49/025 388/816 |
| 4,327,302 A * | 4/1982 | Hershberger | ......... | D06F 37/304 310/156.56 |
| 4,434,546 A * | 3/1984 | Hershberger | ........ | H02K 1/2766 29/418 |

(Continued)

*Primary Examiner* — Carl J Arbes

(74) *Attorney, Agent, or Firm* — Nelson Mullins Riley & Scarborough LLP; Kongsik Kim, Esq.

(57) ABSTRACT

A winding method for a BLDC motor is disclosed. The winding method is configured to successively wind two magnetic wires across each core slot and its adjacent core slot (over two pitches) in a brushless direct current (BLDC) motor including a U-phase winding, a V-phase winding, a W-phase winding and a GND winding, 12 core slots, and a ground terminal. The winding method includes: a first step of moving and winding the magnetic wires; a second step of moving and winding the magnetic wires; a third step of moving and winding the magnetic wires; a fourth step of moving, winding, moving, and cutting the magnetic wires; a fifth step of moving and winding the magnetic wires; and a sixth step of moving the magnetic wires, passing the magnetic wires through an adjacent core slot and the ground terminal, and moving and cutting the magnetic wires.

3 Claims, 2 Drawing Sheets

(56) References Cited

U.S. PATENT DOCUMENTS

| | | | | | |
|---|---|---|---|---|---|
| 4,547,714 | A | * | 10/1985 | Muller | H02K 29/08 310/68 R |
| 4,619,040 | A | * | 10/1986 | Wang | H02K 3/28 174/DIG. 20 |
| 4,806,717 | A | * | 2/1989 | Hershberger | D06F 37/304 310/156.56 |
| 5,424,625 | A | * | 6/1995 | Haner | H02K 29/10 318/725 |
| 5,747,910 | A | * | 5/1998 | Haner | H02K 3/28 310/173 |
| 5,778,703 | A | * | 7/1998 | Imai | D06F 37/40 68/12.02 |
| 5,821,660 | A | * | 10/1998 | Anderson | H02K 3/28 310/184 |
| 6,940,204 | B2 | * | 9/2005 | Yamazaki | F04B 35/04 310/179 |
| 6,995,494 | B2 | * | 2/2006 | Haugan | H02K 21/24 310/156.32 |
| 7,990,013 | B2 | * | 8/2011 | Seo | H02K 3/47 310/216.002 |

\* cited by examiner

WINDING METHOD FOR BLDC MOTOR

BACKGROUND

1. Technical Field

The present invention relates to a winding method for a brushless direct current (BLDC) motor, and more specifically to a winding method for a BLDC motor, which is capable of adjusting a ground copper wire.

2. Description of the Related Art

A motor is a word originating from the Latin term "moto" (move), and refers to a device for generating movement, i.e., a movement generation device. Any device which receives energy and converts it into motion can be called a motor regardless of its shape. The energy which is supplied includes various types of energy, including electricity (in the case of electric motors), heat (in the case of steam engines and Stirling engines), pressure (in the case of internal combustion engines, compressed air engines), potential energy (in the case of watermills), elasticity (in the case of rubber power, and spiral springs), kinetic energy (in the case of windmills), etc. It will be apparent that watermills and windmills are not included in motors in the narrow sense of the word. Furthermore, cases directly using human or animal power are not called motors. The reason for this is that in these cases, only the direction of movement is changed but energy is not converted into movement. Internal combustion engines (of automobiles, etc.), which we often call engines, are also motors which convert the pressure of the expanding gas into movement. Furthermore, rocket engines, which are attached to missile propellants, are also motors which convert the reaction of explosive expanding propellants into movement.

Accordingly, a motor can be viewed as an energy converter which converts electrical energy into mechanical energy. When acting in a reverse manner, it acts as a generator. The force of the motor is generated by the action of a magnetic field and current. In the case of a transportation apparatus, a motor plays a deceleration or generation role in addition to a propulsion role.

Fans, blowers, pumps, machine tools, household appliances, electric tools, hard disks, and general electric motors utilize DC current such as the current of batteries, and motor vehicles, rectifiers, power grids, inverters, and generators are based on AC current. Motors vary in size. Small-sized motors are installed in small-sized watches. Industrial motors are standardized in their size and characteristics. The largest motors (of a 100 megawatt level) are used for ship propulsion, pipeline compression, reservoir dams, etc. These motors are classified according to their power supply type, internal structure, application field, output movement pattern, etc. They are also classified as drivers or converters depending on whether they produce linear or rotary movement and whether or not they convert energy into usable mechanical energy, like solenoids or speakers.

In general, in various types of motors, coils are wound around commutators and cores, current is supplied from the outside to rotate shafts along with the magnetic fields of magnets, and electrical energy is converted into rotational kinetic energy. In the case of a DC motor such as an electric power steering (EPS) motor, current is supplied to the segments of a commutator and the slots of a core through brushes. Winding is basically classified into concentrated winding and distributed winding depending on how a coil is wound in the slots of a core. The concentrated winding is a winding method in which a coil is wound concentrically in one slot, and the distributed winding is a winding method in which a coil is wound in two or more slots. In the case of the distributed winding including the coil winding method of the present invention, there have been developed various winding methods, such as the wave winding disclosed in Korean Patent Application Publication No. 79147 (published on Jul. 5, 2006) and the lap winding disclosed in Korean Patent Application Publication No. 1519 (published Jan. 11, 1994). However, conventional DC motors in which coils are wound by a wave winding or lap winding method have a large number of problems in that the timings at which brushes having the same polarity come into contact with a commutator are different and the sequences, quantities and lengths of coils wound across the opposite slots of a core are different, so that vibration is significant during the operation of the motors and significant noise is generated.

PRIOR ART DOCUMENTS

Patent Documents (Patent document 1) KR 10-2015-0024181 A
(Patent document 2) KR 10-1994-0001519 A
(Patent document 3) KR 10-2006-0079147 A
(Patent document 4) KR 10-1600238 B1

SUMMARY

Accordingly, the present invention has been conceived to overcome the above-described problems, and an object of the present invention is to provide a winding method for a BLDC motor, which is capable of effectively handling a ground copper wire in winding for the BLDC motor.

In order to accomplish the above object, the present invention provides a winding method for a BLDC motor, the method being configured to successively wind two magnetic wires (W) across each core slot and its adjacent core slot (over two pitches) in a brushless direct current (BLDC) motor including a U-phase winding, a V-phase winding, a W-phase winding and a GND winding, 12 core slots, and a ground terminal disposed between any two of the core slots, the method including: a first step of moving the magnetic wires (W) from any A-phase winding of the phase windings to any first pair of core slots and then winding the magnetic wires (W); a second step of moving the magnetic wires (W) to a pair of core slots opposite to the first pair of core slots, winding the magnetic wires (W), and moving the magnetic wires (W) to the GND winding; a third step of moving the magnetic wires (W) from the GND winding to any second pair of core slots across which the magnetic wires (W) are wound at the first and second steps, and then winding the magnetic wires (W); a fourth step of moving the magnetic wires (W) to a pair of core slots opposite to the second pair of core slots, winding the magnetic wires (W), moving the magnetic wires (W) to any B-phase winding across which the magnetic wires (W) are not wound at the first to third steps, and then cutting the magnetic wires (W); a fifth step of moving the magnetic wires (W) from any C-phase winding across which the magnetic wires (W) are not wound at the first to fourth steps to any third pair of core slots across which the magnetic wires (W) are wound at the first to fourth steps, and then winding the magnetic wires (W); and a sixth step of moving the magnetic wires (W) to a pair of core slots opposite to the third pair of core slots, winding the magnetic wires (W), passing the magnetic wires (W) through an adjacent core slot connected to the A-phase winding and the B-phase winding, passing the magnetic wires (W) through the ground terminal in an upward direction, moving the magnetic wires (W) to the GND winding, and then cutting the magnetic wires (W).

The present invention provides the effect of minimizing automation cost and time through the effective handling of the copper wire in winding for a BLDC motor winding, and the effect of reducing manufacturing cost due to reductions in the height of the coils, the volume of the copper wire, and manufacturing time.

DETAILED DESCRIPTION

Although embodiments of the present invention will be described with reference to the accompanying drawings, this is intended to help to facilitate an easier understanding of the present invention, and the scope of the present invention is not limited thereby.

When a portion is described as including a component throughout the specification, this does not mean that another component is excluded but means that the portion may include another component, unless otherwise specified. Furthermore, when a portion is described as being "coupled" or "connected" to another portion, this includes both the case where the former portion is "directly coupled" or "directly connected" to the other portion and the case where the former portion is "electrically coupled" or "electrically connected" to the other portion with a third portion interposed therebetween.

Figure 1:
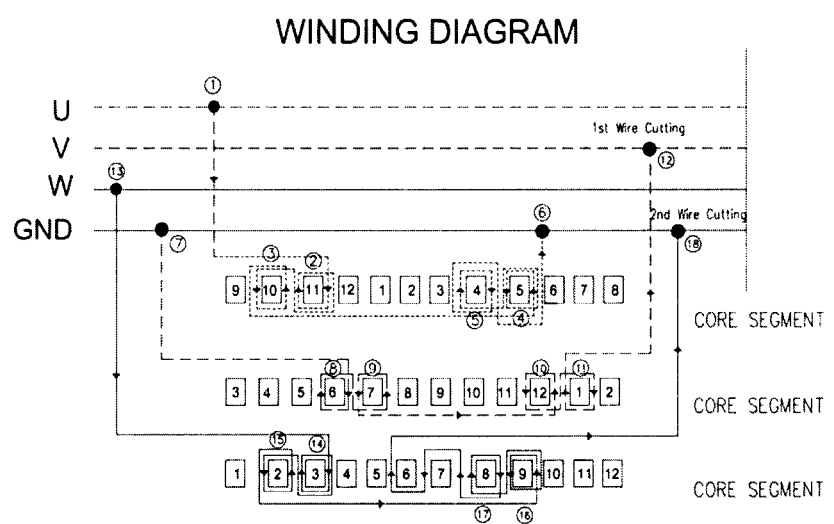
FIG. 1 shows one embodiment of a winding method for a BLDC motor according to the present invention.
Figure 2:
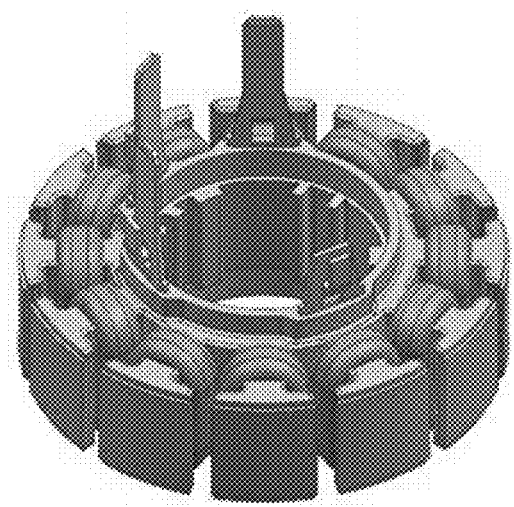
FIG. 2 is a perspective view showing the core of a BLDC motor to which the present invention is applied.

FIG. 1 shows one embodiment of a winding method for a BLDC motor according to the present invention, and FIG. 2 is a perspective view showing the core of a BLDC motor to which the present invention is applied.

A winding method for a BLDC motor according to the present invention is a method configured to successively wind two magnetic wires W across each core slot and its adjacent core slot (over two pitches) in a brushless direct current (BLDC) motor including a U-phase winding, a V-phase winding, a W-phase winding and a GND winding, 12 core slots, and a ground terminal disposed between any two of the core slots, the method including: a first step of moving the magnetic wires W from any A-phase winding of the phase windings to any first pair of core slots and then winding the magnetic wires W; a second step of moving the magnetic wires W to a pair of core slots opposite to the first pair of core slots, winding the magnetic wires W, and moving the magnetic wires W to the GND winding; a third step of moving the magnetic wires W from the GND winding to any second pair of core slots across which the magnetic wires W are wound at the first and second steps, and then winding the magnetic wires W; a fourth step of moving the magnetic wires W to a pair of core slots opposite to the second pair of core slots, winding the magnetic wires W, moving the magnetic wires W to any B-phase winding across which the magnetic wires W are not wound at the first to third steps, and then cutting the magnetic wires W; a fifth step of moving the magnetic wires W from any C-phase winding across which the magnetic wires W are not wound at the first to fourth steps to any third pair of core slots across which the magnetic wires W are wound at the first to fourth steps, and then winding the magnetic wires W; and a sixth step of moving the magnetic wires W to a pair of core slots opposite to the third pair of core slots, winding the magnetic wires W, passing the magnetic wires W through an adjacent core slot connected to the A-phase winding and the B-phase winding, passing the magnetic wires W through the ground terminal in an upward direction, moving the magnetic wires W to the GND winding, and then cutting the magnetic wires W.

Referring to FIG. 1, the present invention is described using an embodiment in greater detail below. The present invention is directed to a method of successively winding two magnetic wires W across each core slot and its adjacent core slot (over two pitches) in a BLDC motor including a U-phase winding, a V-phase winding, a W-phase winding and a GND winding, 12 core slots, and a ground terminal disposed between any two of the core slots.

Numbers 1, 2, . . . , 12 are sequentially allocated to the core slots according to the sequence in which the core slots are arranged, with the ground terminal being disposed between core slots Nos. 5 and 6.

The winding method may include:

a first step of moving the magnetic wires W from the U-phase winding to core slot No. 11;

a second step of winding the magnetic wires W in a clockwise direction from the core slot No. 11 once;

a third step of moving the magnetic wires W from core slot No. 11 to core slot No. 10 and then winding the magnetic wires W in a counterclockwise direction once;

a fourth step of moving the magnetic wires W from core slot No. 10 to core slot No. 5 and then winding the magnetic wires W in a counterclockwise direction twice;

a fifth step of moving the magnetic wires W from core slot No. 5 to core slot No. 4 and then winding the magnetic wires W in a clockwise direction twice;

a sixth step of moving the magnetic wires W from core slot No. 4 to the GND winding;

a seventh step of moving the magnetic wires W from the GND winding to core slot No. 6;

an eighth step of winding the magnetic wires W in a clockwise direction from core slot No. 6 once;

a ninth step of moving the magnetic wires W from core slot No. 6 to core slot No. 7 and then winding the magnetic wires W in a counterclockwise direction once;

a tenth step of moving the magnetic wires W from core slot No. 7 to core slot No. 12 and then winding the magnetic wires W in a counterclockwise direction once;

an eleventh step of moving the magnetic wires W from core slot No. 12 to core slot No. 1 and then winding the magnetic wires W in a clockwise direction once;

a twelfth step of moving the magnetic wires W from core slot No. 1 to the V-phase winding and then cutting the magnetic wires W;

a thirteenth step of moving the magnetic wires W from the W-phase winding to core slot No. 3;

a fourteenth step of winding the magnetic wires W in a clockwise direction from core slot No. 3 once;

a fifteenth step of moving the magnetic wires W from core slot No. 3 to core slot No. 2 and then winding the magnetic wires W in a counterclockwise direction once;

a sixteenth step of moving the magnetic wires W from core slot No. 2 to core slot No. 9 and then winding the magnetic wires W in a counterclockwise direction twice;

a seventeenth step of moving the magnetic wires W from core slot No. 9 to core slot No. 8 and then winding the magnetic wires W in a clockwise direction once; and an eighteenth step of moving the magnetic wires W from the core slot No. 8, passing the magnetic wires W through an interval between core slot No. 6 and core slot No. 7, passing the magnetic wires W through an interval between core slot No. 6 and core slot No. 5, moving the magnetic wires W to the GND winding through the ground terminal, and cutting the magnetic wires W.

The above-described numbers (the numbers of the core slots) and the sequence of the U-, V-, and W-phase windings are intended merely to facilitate an understanding of the present invention. The numbers, the sequence of the windings, and the winding directions may vary depending on the settings of an operator. The above-described numbers are not limited thereto.

The method proposed according to the present invention has been described using an example with reference to FIG. 1. When the above-described method is employed, there can be achieved the effect of minimizing the quantity of windings, the effect of minimizing automation cost and time through the effective handling of the copper wire, and the effect of reducing manufacturing cost due to reductions in the height of the coils, the volume of the copper wire, and manufacturing time.

Furthermore, the quantities of windings wound across the core slots are balanced, and thus there can be achieved the effect of improving the performance of the BLDC motor.

Although the embodiments of the present invention have been described with reference to the accompanying drawings, it will be apparent to a person having ordinary knowledge in the art to which the present invention pertains that various applications and modifications may be made without departing from the scope of the present invention based on the foregoing description.

What is claimed is:

1. A winding method for a BLDC motor, the method being configured to successively wind two magnetic wires (W) across each core slot and its adjacent core slot (over two pitches) in a brushless direct current (BLDC) motor including a U-phase winding, a V-phase winding, a W-phase winding and a GND winding, 12 core slots, and a ground terminal disposed between any two of the core slots, the method comprising:

a first step of moving the magnetic wires (W) from any A-phase winding of the phase windings to any first pair of core slots and then winding the magnetic wires (W);

a second step of moving the magnetic wires (W) to a pair of core slots opposite to the first pair of core slots, winding the magnetic wires (W), and moving the magnetic wires (W) to the GND winding;

a third step of moving the magnetic wires (W) from the GND winding to any second pair of core slots across which the magnetic wires (W) are wound at the first and second steps, and then winding the magnetic wires (W);

a fourth step of moving the magnetic wires (W) to a pair of core slots opposite to the second pair of core slots, winding the magnetic wires (W), moving the magnetic wires (W) to any B-phase winding across which the magnetic wires (W) are not wound at the first to third steps, and then cutting the magnetic wires (W);

a fifth step of moving the magnetic wires (W) from any C-phase winding across which the magnetic wires (W) are not wound at the first to fourth steps to any third pair of core slots across which the magnetic wires (W) are wound at the first to fourth steps, and then winding the magnetic wires (W); and a sixth step of moving the magnetic wires (W) to a pair of core slots opposite to the third pair of core slots, winding the magnetic wires (W), passing the magnetic wires (W) through an adjacent core slot connected to the A-phase winding and the B-phase winding, passing the magnetic wires (W) through the ground terminal in an upward direction, moving the magnetic wires (W) to the GND winding, and then cutting the magnetic wires (W).

2. The method of claim 1, wherein the A-, B-, and C-phases are any one of: U-, V-, and W-phases, U-, W-, and V-phases, V-, U-, and W-phases, V-, W-, and U-phases, W-, U-, and V-phases, and W-, V-, and U-phases which are sequentially moved and wound.

3. The method of claim 1, wherein the first pair of core slots are a pair of core slots opposite to a pair of core slots disposed on a left or right side of the ground terminal.

* * * * *